United States Patent [19]

Luttrell

[11] 3,999,641
[45] * Dec. 28, 1976

[54] VEHICLE TRANSMISSION NEUTRALIZING SYSTEM

[75] Inventor: Richard W. Luttrell, Morton, Ill.

[73] Assignee: Caterpillar Tractor Co., Peoria, Ill.

[ * ] Notice: The portion of the term of this patent subsequent to Apr. 28, 1991, has been disclaimed.

[22] Filed: Aug. 14, 1972

[21] Appl. No.: 280,726

[52] U.S. Cl. .............................. 192/4 A; 192/109 A
[51] Int. Cl.² ................... F16D 67/04; B60K 29/02
[58] Field of Search ................... 192/4 A, 4 C, 13 R

[56] References Cited

UNITED STATES PATENTS

| | | | |
|---|---|---|---|
| 3,050,165 | 8/1962 | Day et al. ...................... | 192/4 A X |
| 3,292,752 | 12/1966 | Schuster et al. ............... | 192/4 A X |
| 3,339,672 | 9/1967 | Crandall ......................... | 192/13 X |
| 3,441,114 | 4/1969 | Pensa ............................. | 192/4 C |

Primary Examiner—Benjamin W. Wyche
Attorney, Agent, or Firm—Phillips, Moore, Weissenberger, Lempio & Strabala

[57] ABSTRACT

A control system for a vehicle includes fluid pressure actuated brakes and a fluid-pressure engaged transmission. A pair of brake pedals is provided, the first actuating the brakes only, and the second actuating the brakes and also operating a valve for releasing transmission pressure upon application of the second brake pedal, and holding transmission pressure upon release of the second brake pedal. Such valve is operated by transmission of movement of the second brake pedal to a movable valving element, with means provided so that for a given movement of the second brake pedal, the valving element moves less, to provide a degree of valve sensitivity. Adjustment means are associated with the second brake pedal and valving element, to synchronize the operation of the brakes with the engagement and disengagement of the transmission.

2 Claims, 4 Drawing Figures

VEHICLE TRANSMISSION NEUTRALIZING SYSTEM

BACKGROUND OF THE INVENTION

This invention relates to apparatus for automatically disengaging and engaging a vehicle transmission upon movement of a brake pedal thereof, and more particularly, to such apparatus which may be synchronized to provide properly timed disengagement and engagement of the transmission relative to the application and release of the brakes.

The invention is particularly applicable to loaders of the type in which an engine employed to power the vehicle for movement from place to place is also employed to provide power, often through hydraulic pumps, to raise and manipulate a bucket, fork or other material handling device carried by the vehicle. It has been recognized as desirable to employ a connection between a brake pedal of a loader and its transmission to neutralize the transmission automatically upon actuation of the brakes. This has the advantage of freeing the hands of the operator to manipulate the bucket controls, instead of actuating a transmission of clutch lever first, and also insures availability of the full power of the engine for manipulating the bucket without delay.

In accordance with this advantage, a number of loaders have employed a dual brake pedal arrangement, one of which applies the brakes only, and the other of which disengages or neutralizes the transmission while also applying the brakes. (See, for example, U.S. Pat. No. 3,050,165 to Day et al, U.S. Pat. No. 3,181,667 to Lohbauer et al, and U.S. Pat. No. 3,565,220 to Lammers et al, all assigned to the assignee of this application.) In such systems, the neutralizer valve is commonly actuated by fluid pressure from a vehicle pressure source upon movement of the brake pedal. A study of these patents reveals that each includes a relatively complex valving arrangement for actuating the neutralizer valve and synchronizing (i) such neutralizing of the transmission with the application of the brakes, and (ii) engagement of the transmission upon release of the brakes. Such systems, while having proven quite effective for use, are relatively complex and expensive. Consequently, to overcome these problems, it would be desirable to provide relatively simple, inexpensive mechanical means for actuating an also simple, inexpensive neutralizing valve.

In the design of such means certain problems have arisen. It has been found that, with a neutralizing valve having a valving element of relatively short stroke (which is generally the case) it is difficult to achieve proper synchronization of operation of the valve with operation of the brake pedal, so that disengagement and engagement of the transmission can be achieved at the proper point of application and release of the brakes. Another problem encountered is that of providing that the brake pedal is allowed to return freely to its released position, and be operated in a normal manner, without interference by such mechanical means.

SUMMARY OF THE INVENTION

It is therefore an object of this invention to provide mechanical means for neutralizing a vehicle transmission upon application of the vehicle brakes.

It is a further object of this invention to provide means which, while fulfilling the above object, allow for proper synchronization of disengagement of the transmission with application of the brakes, and engagement of the transmission with release of the brakes.

It is a still further object of this invention to provide means which, while fulfilling the above objects, allow normal operation of the braking system without interference therewith.

It is a still further object of this invention to provide means which, while fulfilling the above objects, are simple and convenient for use.

Broadly stated, the invention is in combination with a vehicle having brakes and a transmission, and comprises means including first brake pedal movable in a brake-applying direction to apply the brakes of the vehicle, and movable in a brake-releasing direction to release the brakes of the vehicle. Further included are means including a second brake pedal, movable in a brake-applying direction to apply the brakes of the vehicle, and movable in a brake releasing direction to release the brakes of the vehicle. Further included are means movable to engage the transmission and disengage the transmission. Means are included for transmitting the movement of the second brake pedal to the movable means to move said movable means to disengage the transmission upon movement of the second brake pedal to apply the brakes and to move the movable means to engage the transmission upon movement of the second brake pedal to release the brakes.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
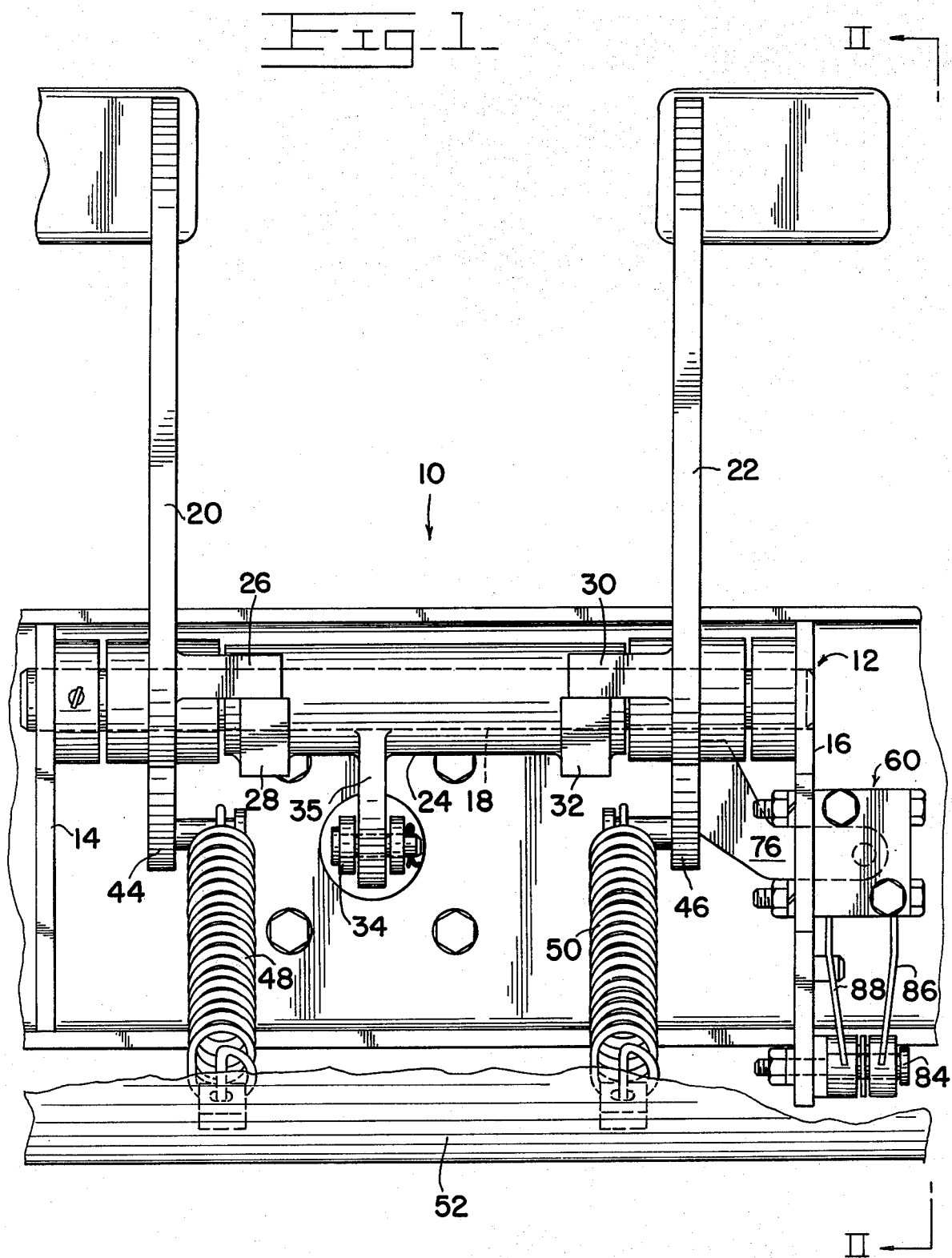
FIG. 1 is a front elevation, partially broken away, of the dual-brake-pedal system incorporating the invention.
Figure 4:
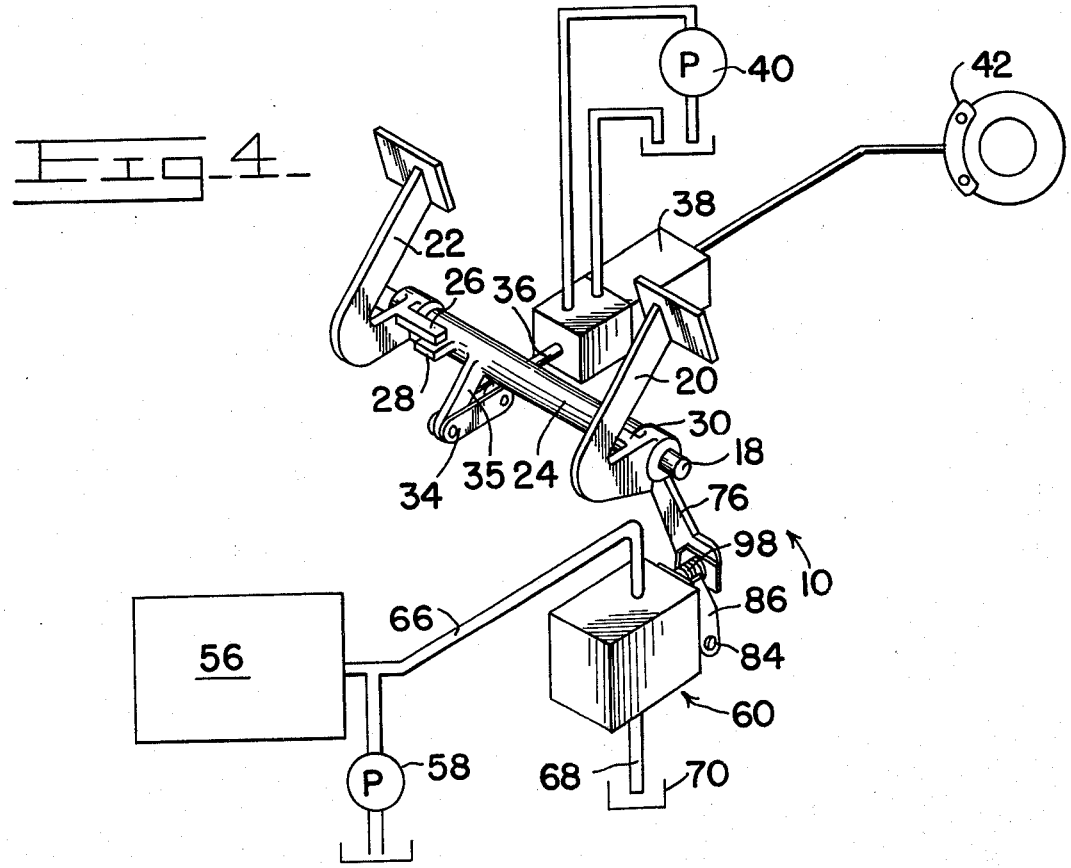

Shown in FIGS. 1 and 4 is the system 10. Such system 10 is incorporated in a vehicle (not shown) generally having a support frame 12. The support frame 12 includes spaced support brackets 14, 16, and a support shaft 18 extending from one support bracket to the other, with its ends fixed thereto. Pedals 20, 22 are pivotally mounted on the shaft 18 and are spaced apart by a tube 24 pivotally disposed on shaft 18. Pedal 20 has an inwardly extending tab 26 in position to contact a lug 28 formed on the tube 24. Likewise, pedal 22 has an inwardly extending tab 30 in position to contact a lug 32 formed on tube 24. Linkage means 34 interconnect a lever arm 35 fixed to the tube 24 and a control rod 36, for controlling a brake control valve 38. Upon actuation of the control valve 38, pressurized fluid from a fluid pressure source 40 may be directed to a brake 42, and upon release of control valve 38, fluid pressure is released from brake 42, as is well known.

It will be seen that movement of either brake pedal 20, 22 in a brake-applying direction directs fluid pressure from the source 40 to the brake 42, to apply the brakes of the vehicle, and movement of either brake pedal 20, 22 in a brake-releasing direction releases fluid pressure from the brake 42 of the vehicle, to release the brakes.

Fixed to brake pedals 20, 22, are arms 44, 46, which are movable therewith. Springs 48, 50 under tension, interconnect these arms 44, 46 with a portion 52 of support frame 12, so that upon release of either brake pedal 20, 22, such pedal is returned to a brake-releasing position against a stop means, as for example, that shown for pedal 22 in FIG. 2, wherein a stop portion 54 formed on the pedal 22 contacts an edge 55 of support frame 12.

The system 10 also includes a transmission 56 which is engaged upon application of fluid pressure thereto, and which may be disengaged or neutralized upon release of such fluid pressure, as is well known. A pressure source 58 communicates with the transmission 56 to supply such pressurized fluid thereto. Also communicating with the transmission 56 is a valve 60 for releasing and maintaining fluid pressure in the transmission 56, as will now be described in detail.

Valve 60 has a rigid valve body 62 fixed to the support bracket 16 and includes rigid end member 64. Such valve 60 communicates with transmission 56 by means of pipe 66, with another pipe 68 from the valve 60 communicating with a pressure relief tank 70. Movably mounted within the valve body 62 is a valving element or spool 72. Such spool 72, it will be seen, is movable to the position shown in FIG. 2 to close the valve 60, so that fluid pressure is maintained in the transmission 56, so that in turn the transmission 56 is engaged. The spool 72 is also movable to the position shown in FIG. 3, so that an annular channel 74 formed in spool 72 is positioned to allow communication of pipe 66 with pipe 68, to in turn release the fluid pressure from transmission 56, so that transmission 56 is neutralized or disengaged.

Figure 2:
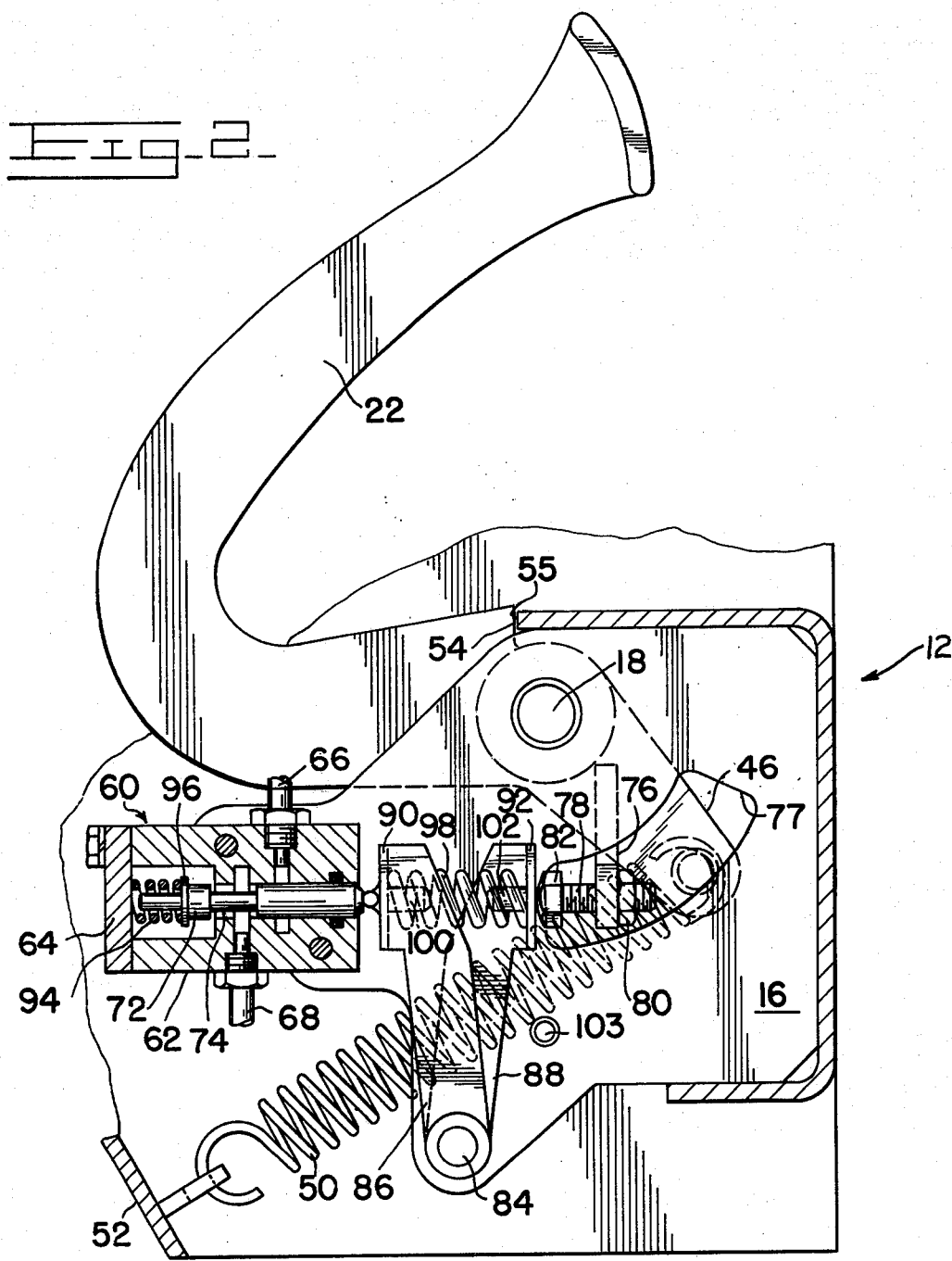
FIG. 2 is a sectional view taken along the line II—II of FIG. 1, showing the system in a brake-released, transmission-engaged situation.
Figure 3:
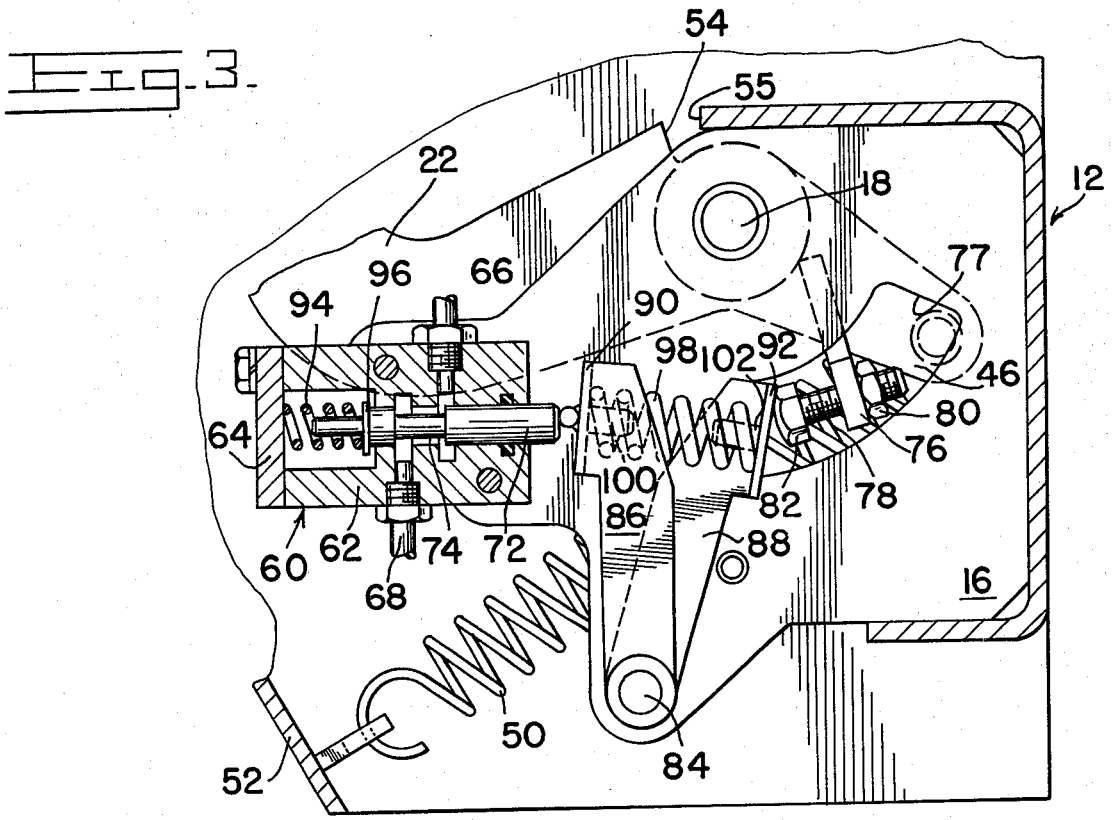
FIG. 3 is a view similar to that of FIG. 2, but showing the system in a brake-actuated, transmission-disengaged situation; and, FIG. 4 is a schematic view of the system embodying the invention.

Included are means for transmitting the movement of the brake pedal 22 to the spool 72 to move the spool 72 to the position shown in FIG. 3 upon movement of the brake pedal 22 to apply the brakes 42, and to move the spool 72 to the position shown in FIG. 2 upon movement of the brake pedal 22 to release the brakes 42. Such means will now be described in detail.

Arm 46 has an arm portion 76 extending therefrom through an aperture 77 in support bracket 16. A bolt 78 is threadably connected with arm portion 76, and it has a lock nut 80 disposed thereon so that the position of the head 82 of bolt 78 may be adjusted relative to arm portion 78 (and thus relative to the brake pedal 22) and then locked in position by lock nut 80 so that bolt 78 may be fixed in position relative to arm portion 76 (and thus relative to brake pedal 22).

Pivotally fixed to the support bracket 16 by means of a pin 84 are scissors members 86, 88, as shown in FIGS. 1, 2 and 3. The distal ends 90, 92 of the scissors members 86, 88 respectively are interposed between the bolt 78 and spool 72 (see FIGS. 2 and 3). A resilient helical spring 94 is interposed between the spool 72 flange portion 96 and the end member 64 of valve body 62. A resilient helical spring 98 is interposed between the distal ends 90, 92 of scissors members 86, 88, being retained therein by pins 100, 102 associated with the distal ends 90, 92 respectively. Such spool 72 is balanced between the helical springs 94, 98 under the force of both.

Looking now at FIG. 2, with the brake pedal 22 in its brake-releasing position, spool 72 is balanced between springs 94, 98 in such a position that valve 60 is closed, i.e., pipe 66 does not communicate with pipe 68, so that fluid pressure is maintained in the transmission 56 to keep it engaged. Upon movement of the brake pedal 22 in a brake-applying direction (FIG. 3), arm portion 76 and bolt 78 fixed thereto move with the brake pedal 22, and these, in turn, through spring 98, move spool 72 rightward as shown in the drawings, with the scissors members 86, 88 pivoting about pin 84. A stop pin 103 is fixed to support bracket 16 as shown, to limit the movement of member 88 in this direction, to insure that spring 98 remains between the distal ends 90, 92 of scissors members 86 and 88. Part of the overall movement of arm portion 76 is taken up by spring 94, and part is taken up by spring 98, so that for a given amount of movement of the arm portion 76, the spool 72 moves less than that arm portion 76.

Upon further application of the brakes 42 by brake pedal 22, the spool 72 moves to the position shown in FIG. 3, so that it is positioned to allow communication therethrough between pipes 66 and 68, so that fluid pressure no longer is maintained in transmission 56. Upon release of such fluid pressure, the transmission 56 is disengaged, as described above. Upon release of brake pedal 22, and movement thereof to release the brakes 42, the spool 72 moves back into its position shown in FIG. 2 to close off communication between pipes 66, 68, so that pressure is built up in the transmission 56 again and it engages. Again, as described above, a given movement of arm portion 76 results in a lesser degree of movement of the spool 72.

The bolt 78 and locking nut 80 associated with arm portion 76 actually serve as an adjusting means for valve 60, for adjusting opening and closing of the valve 60 relative to the position of the brake pedal 22 to synchronize this disengagement of the transmission 56 with the application of the brakes 42 through movement of the brake pedal 22, and the engagement of the transmission 56 with the release of the brakes 42 through movement of the brake pedal 22.

Taking FIG. 2 as a starting point, lock nut 80 may be loosened and bolt 78 turned to extend, for example, further from arm portion 76. This has the effect, in such rest position of FIG. 2, of stationing spool 72 slightly to the left of the position shown in FIG. 2. Upon movement of brake pedal 22 to apply the brakes 42, valve 60 will open slightly later than before, providing a slightly delayed disengagement of the transmission 56 relative to application of the brakes 42. Thus, the opening point of valve 60 may be adjusted so that the brakes 42 are partially applied before the transmission 56 is disengaged, and, upon release of the pedal 22, the transmission 56 is engaged before the brakes 42 are released. Since the movement of the spool 72 is proportionately less than that of arm portion 76 and bolt 78, a finer control is maintained over the spool 72, both during operation and adjusting procedure for setting the opening-closing point of the valve 60.

In a particular design, the spring rate of spring 98 was chosen as approximately 1½ times that of spring 94, so that spool 72 moves only about 3/5 the distance that bolt 78 or arm portion 76 moves. It will be understood, however, that various spring rates may be chosen in accordance with the particular needs involved.

It will be seen that the mechanical system provided herein allows simple and convenient adjustment thereof to synchronize opening and closing of the valve 60 with the use of brake pedal 22. This feature, in combination with the slow movement of the spool 72 relative to the arm portion 76 of the brake pedal 22, insures relatively great operative control of the vehicle. Such a mechanical system, furthermore, has been found not to interfere with the normal operation of the brake pedals 20, 22, the springs 48, 50, insuring that these pedals 20, 22 return freely to their released positions, without interference by such mechanical means.

What is claimed is:

1. In combination with a vehicle having fluid pressure actuated brakes and a fluid pressure engaged transmission:
   a. a fluid pressure source communicating with the transmission to supply pressurized fluid thereto;
   b. means including a first brake pedal movable in a brake-applying direction to direct fluid pressure from said source to the brakes to apply the brakes of the vehicle, and movable in a brake releasing direction to release fluid pressure from the brakes to release the brakes of the vehicle;
   c. means including a second brake pedal movable in a brake-applying direction to direct fluid pressure from said source to the brakes to apply the brakes of the vehicle, and movable in a brake-releasing direction to release fluid pressure from the brakes to release the brakes of the vehicle;
   d. a valve communicating with the transmission and having a valve body fixed relative to the vehicle and a valving element associated with the valve body and movable to close the valve to maintain fluid pressure in the transmission to engage such transmission, and movable to open the valve to release fluid pressure from said transmission to disengage said transmission;
   e. an arm fixed relative to the second brake pedal and movable therewith;
   f. adjustment means mounted to the arm and adapted to be fixed in position relative thereto for movement therewith;
   g. first and second scissors members fixed pivotally relative to the vehicle and having the distal ends thereof interposed between the adjustment means and valving element;
   h. a first helical spring interposed between the valving element and valve body;
   i. a second helical spring interposed between the distal ends of the scissors members, so that the valving element is balanced between the first and second helical springs, and movable to open the valve to disengage the transmission upon movement of the second brake pedal to apply the brakes, and movable to close the valve to engage the transmission upon movement of the second brake pedal to release the brakes, the amount of movement of the valving element in balance between said first and second helical springs being less than the corresponding amount of movement of the arm fixed relative to the brake pedal; and,
   j. said adjustment means being adapted to be positioned relative to the arm fixed to the second brake pedal to synchronize the disengagement of the transmission with the application of the brakes through movement of the second brake pedal, and engagement of the transmission with the release of the brakes through movement of the second brake pedal.

2. The combination according to claim 1 wherein the adjustment means comprise a bolt threadably connected with the arm, and a nut disposed on said second bolt for locking the bolt in a fixed position relative to the arm.

* * * * *

UNITED STATES PATENT AND TRADEMARK OFFICE
CERTIFICATE OF CORRECTION

PATENT NO. : 3,999,641
DATED : December 28, 1976
INVENTOR(S) : Richard W. Luttrell It is certified that error appears in the above-identified patent and that said Letters Patent are hereby corrected as shown below:

Title Page, Section [*], "1991" should be --1992--.

Signed and Sealed this

First Day of November 1977

[SEAL]

Attest:

RUTH C. MASON
*Attesting Officer*

LUTRELLE F. PARKER
*Acting Commissioner of Patents and Trademarks*